(12) United States Patent
Woker et al.

(10) Patent No.: US 7,675,678 B2
(45) Date of Patent: Mar. 9, 2010

(54) LOCKING INTER-PUPILLARY DISTANCE AND CONVERGENCE ADJUSTMENT MECHANISM

(75) Inventors: Gary Woker, Escondido, CA (US); Jack Greelis, Carlsbad, CA (US)

(73) Assignee: PeriOptix, Mission Viejo, CA (US)

( * ) Notice: Subject to any disclaimer, the term of this patent is extended or adjusted under 35 U.S.C. 154(b) by 152 days.

(21) Appl. No.: 11/269,464

(22) Filed: Nov. 8, 2005

(65) Prior Publication Data

US 2007/0103774 A1    May 10, 2007

(51) Int. Cl.
    *G02B 23/00* (2006.01)
(52) U.S. Cl. ...................... 359/412; 359/407
(58) Field of Classification Search .................. None
    See application file for complete search history.

(56) References Cited

U.S. PATENT DOCUMENTS

| | | | |
|---|---|---|---|
| 1,851,579 A | | 3/1932 | Hixon |
| 2,456,521 A | | 12/1948 | Maxwell |
| 3,029,696 A | * | 4/1962 | Schmidt ................ 359/411 |
| 3,273,456 A | | 9/1966 | Felnbloom |
| 3,865,468 A | | 2/1975 | Holcomb |
| 4,098,002 A | | 7/1978 | Campbell |
| 4,196,966 A | | 4/1980 | Malis |
| 4,272,153 A | | 6/1981 | Beecher |
| 4,364,645 A | | 12/1982 | Feinbloom |
| 4,449,787 A | | 5/1984 | Burbo |
| 4,659,196 A | | 4/1987 | Gazeley |
| 4,676,609 A | | 6/1987 | Matsui |
| 4,681,413 A | | 7/1987 | Schmidt |
| 4,818,086 A | | 4/1989 | Moore |
| 4,834,525 A | | 5/1989 | Vansaghi |
| 4,858,997 A | * | 8/1989 | Shubin ................ 297/487 |
| 4,865,438 A | | 9/1989 | Wada |
| 4,955,702 A | | 9/1990 | Nakamura |
| 4,961,626 A | * | 10/1990 | Fournier et al. ............. 359/630 |
| 5,062,698 A | | 11/1991 | Funathu |
| 5,076,682 A | | 12/1991 | Pasfield |
| 5,078,469 A | | 1/1992 | Clark |
| 5,088,809 A | | 2/1992 | Portney |
| 5,179,735 A | | 1/1993 | Thomanek |
| 5,196,028 A | | 3/1993 | Portney |
| 5,278,695 A | | 1/1994 | Gebelein |
| 5,335,110 A | | 8/1994 | Shin |
| 5,372,504 A | | 12/1994 | Buechler |
| 5,381,263 A | | 1/1995 | Nowak |
| 5,446,507 A | | 8/1995 | Chang |
| 5,515,209 A | | 5/1996 | Buchroeder |
| 5,627,690 A | | 5/1997 | Caplan |
| 5,667,291 A | | 9/1997 | Caplan |
| 5,680,195 A | | 10/1997 | Pekar |

(Continued)

OTHER PUBLICATIONS

Merriam-Webster's Collegiate Dictionary, Eleventh Edition, 2004, pp. 603 and 1284.*

*Primary Examiner*—Stephone B Allen
*Assistant Examiner*—Derek S Chapel
(74) *Attorney, Agent, or Firm*—Merle W. Richman, III

(57) ABSTRACT

Improvement to an adornable binocular device having a telescope pair and an adjustable inter-pupillary distance (IPD) where both telescopes move simultaneously and substantially the same distance when the IPD is adjusted, the improvement including a mechanism for releasably preventing unintentional adjustment of the IPD and including a first releasably pivoting coupling between each telescope and arm and a second releasably slideable coupling between each telescope and arm.

11 Claims, 9 Drawing Sheets

U.S. PATENT DOCUMENTS

| | | |
|---|---|---|
| 5,734,499 A | 3/1998 | Matsumoto |
| 5,838,421 A | 11/1998 | Pedack |
| 5,940,166 A | 8/1999 | Miller |
| 5,973,830 A | 10/1999 | Ichikawa |
| 6,061,189 A | 5/2000 | Caplan |
| 6,064,520 A | 5/2000 | Nowak |
| 6,201,640 B1 | 3/2001 | Caplan |
| 6,333,814 B1 | 12/2001 | Chang |
| 8,356,400 | 3/2002 | Goff |
| 6,439,714 B1 | 8/2002 | Cummings |
| 6,667,832 B2 | 12/2003 | Caplan |
| 6,704,141 B1 | 3/2004 | Nowak |
| 6,704,142 B2 | 3/2004 | Caplan |
| 7,152,498 B2 * | 12/2006 | Shahana et al. ............ 74/502.6 |
| 2002/0036822 A1 * | 3/2002 | Karaki et al. ............... 359/368 |
| 2004/0125444 A1 | 7/2004 | Caplan |
| 2004/0190137 A1 | 9/2004 | Kim |
| 2004/0283954 | 12/2004 | Wilt |
| 2005/0174651 A1 | 8/2005 | Spitzer |

* cited by examiner

LOCKING INTER-PUPILLARY DISTANCE AND CONVERGENCE ADJUSTMENT MECHANISM

BACKGROUND

1. Field of the Invention

The invention relates generally to adjustable binocular devices, and more particularly, to adjustable binocular loupes.

2. Description of Related Art

In some adornable binocular devices a user may need to adjust the inter-pupillary distance ("IPD") between the telescopes or the convergence between the telescopes of the binocular device. It is desirable that such adjustments are simple and stable. The present invention provides simple and stable IPD and convergence adjustment systems for adornable binocular devices.

SUMMARY OF THE INVENTION

The present invention includes improving an adornable binocular device having a telescope pair and an adjustable inter-pupillary distance (IPD). In the device both telescopes move simultaneously and substantially the same distance when the IPD is adjusted. The improvement includes a mechanism for releasably preventing unintentional adjustment of the IPD. In an embodiment where the device has an IPD adjustment mechanism, the improvement may include a mechanism for releasably preventing unintentional activation of the IPD adjustment mechanism.

In an embodiment the IPD adjustment mechanism may be activated by a rotational force. In this embodiment, the improvement may include a mechanism for releasably preventing unintentional rotation of the IPD adjustment mechanism. In an embodiment, the IPD adjustment mechanism may be coupled to housing. In this embodiment the improvement may include a mechanism for releasably preventing unintentional rotation of the IPD adjustment mechanism by releasably applying a compressive force from the IPD adjustment mechanism to the housing. In an embodiment the improvement mechanism may include a spring. Further in an embodiment the IPD adjustment mechanism and housing may include matable teeth.

In an embodiment the device may have two moveable arms with one of the telescope pair attached to each arm. In this embodiment the improvement may include a mechanism for releasably preventing unintentional displacement of the moveable arms. In an embodiment the device may have a housing that holds at least a portion of two moveable arms. In this embodiment the improvement may include a mechanism for releasably preventing unintentional displacement of the moveable arms by releasably applying compressive force from the least a portion of the two moveable arms to the housing. In an embodiment the mechanism may include a cam.

The present invention also includes improving an adornable binocular device having a telescope pair where each telescope is pivotally mounted to an arm to permit convergence adjustment. In this embodiment, the improvement may include a first releasably pivoting coupling between each telescope and arm. The improvement may also include a second releasably slidable coupling between each telescope and arm. In an embodiment, the second coupling may be located one of more forward or more rearward on the telescope than the first coupling. In an embodiment the second releasably slidable coupling may include a partial radial slot in the arm. In an embodiment the partial radial slot in the arm may be dimensioned to permit at least 4 degrees of movement of telescope relative the first releasably pivoting coupling. In an embodiment, the first releasably pivoting coupling may include a mechanical element extending from the arm into the telescope.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Throughout this description, embodiments and variations are described for the purpose of illustrating uses and implementations of the invention. The illustrative description should be understood as presenting examples of the invention, rather than as limiting the scope of the invention.

Figure 1A:
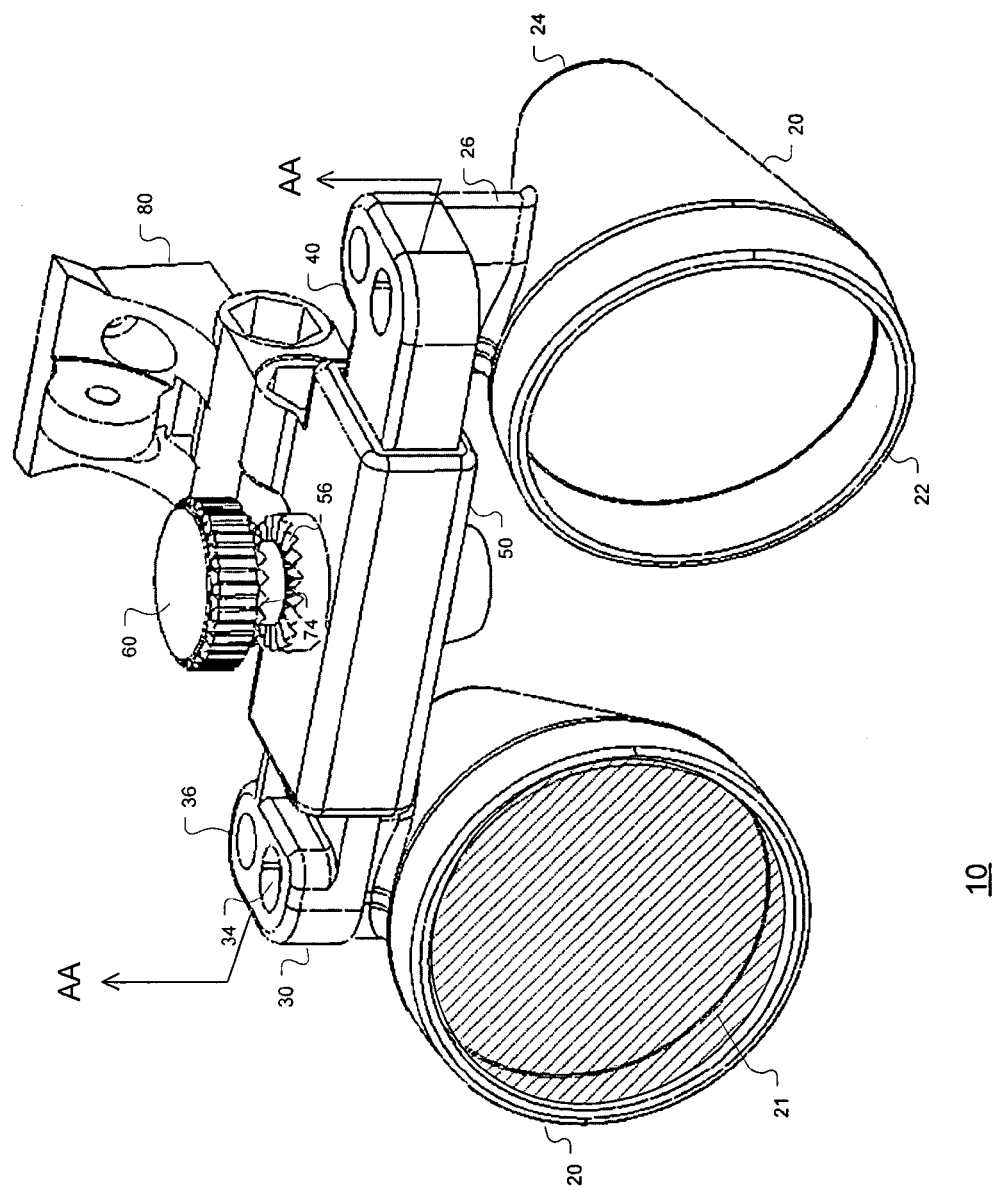
FIG. 1A is an isometric view of a binocular system in accordance with an embodiment of the present invention.
Figure 1B:
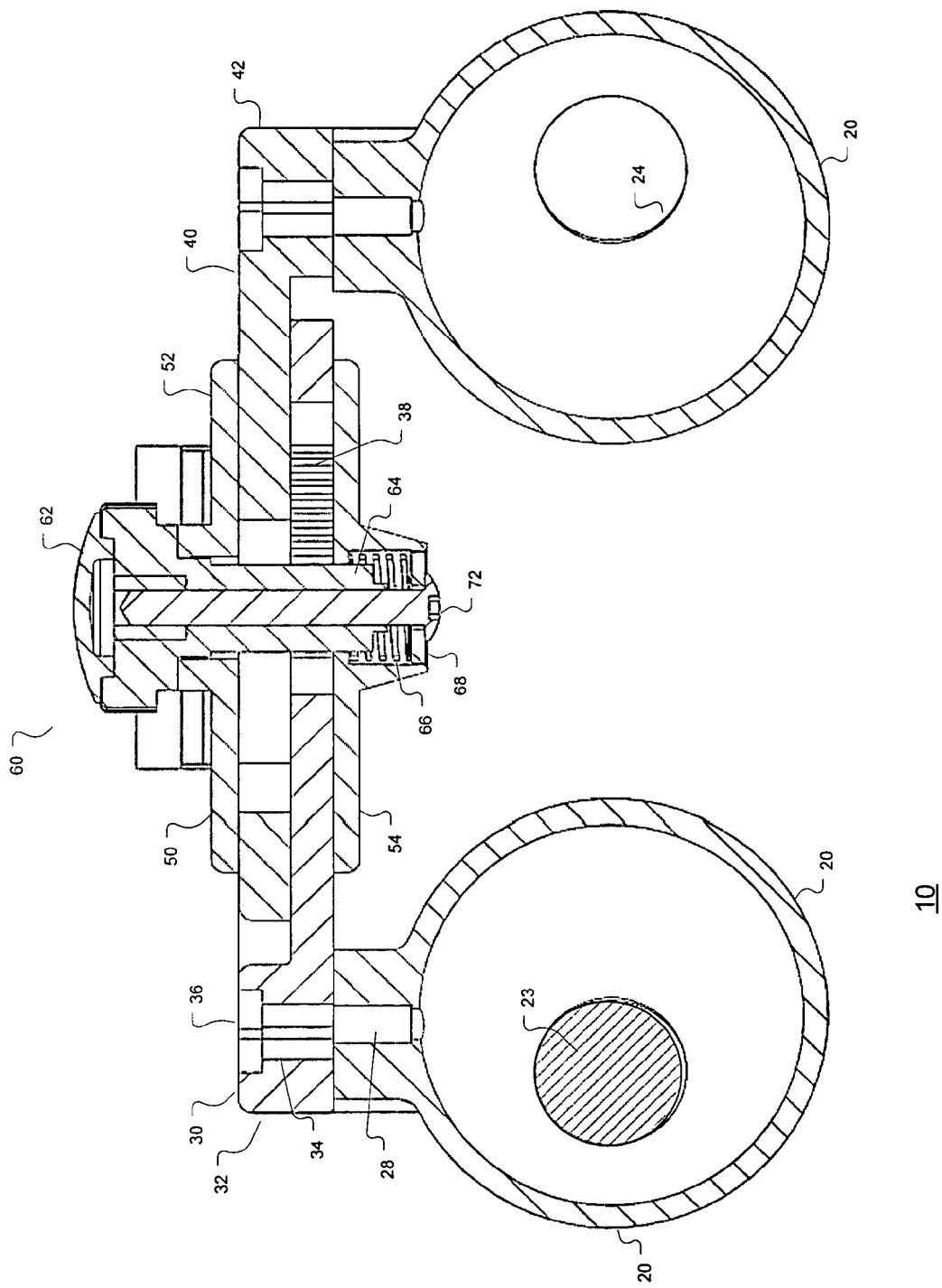
FIG. 1B is a sectional view of the binocular system shown in FIG. 1A taken along the line AA.
Figure 1C:
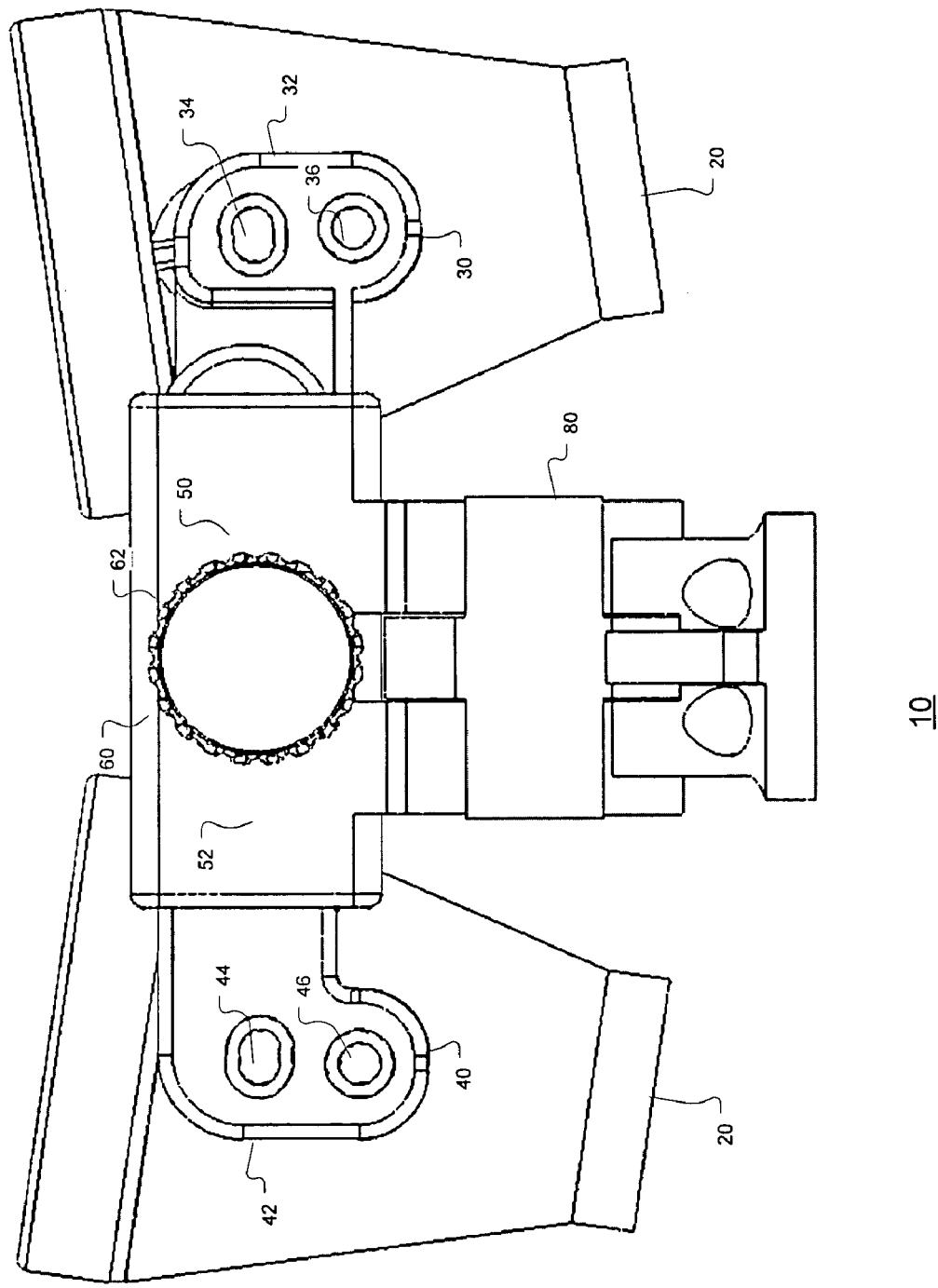
FIG. 1C is a top view of the binocular system shown in FIG. 1A.

FIG. 1A is an isometric view of a binocular system or loupes 10 in accordance with an embodiment of the present invention. FIG. 1B is a sectional view of the binocular loupes 10 shown in FIG. 1A taken along the line AA. FIG. 1C is a top view of the binocular loupes 10 shown in FIG. 1A. The binocular loupes 10 include a telescope or barrel pair 20, a housing 50, a right arm 30 coupling a barrel of a barrel pair 20 to the housing 50, a left arm 40 coupling a barrel of a barrel pair 20 to the housing 50, an IPD adjustment mechanism 60, and a mount 80. The loupes 10 may adorned by a user via the mount 80 where the mount 80 may be coupled to device(s) that enable the user to place the loupes 10 in their vision pathway, e.g., the devices may include spectacles or a head band. The mount 80 is coupled to the housing 50. In an embodiment the mount 80 may be incorporated in the housing 50.

In an embodiment each barrel 20 has a front 22, a back 24, and a housing arm extension 26, and screw openings 28. The barrel or telescope 20 may include one or more lens located between, near, or at the barrel or telescope front 22 and back 24. In FIG. 1A, a lens 21 is shown in right barrel front 22 and in FIG. 1B a lens 23 is shown in the right barrel rear 23. Lenses are not shown in the left barrel in these figures for the sake of clarity. The right arm 30 moveably couples a barrel 20 via its extension 26 to the housing 50. The left arm 40 moveably couples the other barrel 20 via its extension 26 to the housing 50. In an embodiment the right arm 30 includes a rail having an end 32, a gear rack 38, a partial radial screw slot 34, and a pivot screw slot 36. In this embodiment the left arm 40 also includes a rail having an end 42, a gear rack 48, a partial radial screw slot 44, and a pivot screw slot 46. In this embodiment 10 the barrel extension 26 includes a rear and a front screw hole 28.

As shown in FIG. 1C, the right arm 30 partial radial screw slot 34 is oriented to a barrel front 22 to engage the barrel 20 extension 26 front screw hole 28. The right rail 30 pivot screw slot 36 is oriented to a barrel rear 24 to engage the barrel 20 extension 26 rear screw hole 28. Similarly, the left arm 40 partial radial screw slot 44 is oriented to a barrel front 22 to engage the barrel 20 extension 26 front screw hole 28. The left rail 40 pivot screw slot 46 is oriented to the barrel rear 24 to engage the barrel 20 extension 26 rear screw hole 28. In another embodiment, the pivot screw slots 36, 46 may be oriented to a barrel front 22 or adjacent the partial radial slots 34, 44. Accordingly in another embodiment the pivot screw slots 36, 46 may engage the barrel 20 extension 26 front screw holes 28 and the partial radial screw slots 34, 44 may engage the barrel 20 extension 26 rear screw holes 28. In an embodiment different mechanical elements may be employed in the slots 34, 36, 44, 46 for example the extension 26 holes 28 may include a threaded bolt. Further, the screw or bolt may be coupled to a cam based element where the cam based element is rotated from a free, non-compressive state to an active, compressive state.

The radial section of the slot 34 and 44 of the arms 30, 40 is selected to permit about 4 to 8 degrees of movement of the barrel front 22 relative the barrel rear 24 via the pivot slot 36, 46. This enables a user to adjust or set the convergence angle between the barrel or telescope pair 20 and then stably lock each barrel 20 via its extension 26 to an arm 30, 40 via a first screw passing the arm 30, 40 pivot screw slot 36, 46 into the barrel extension 26 screw hole 28 and a second screw passing through the arm 30, 40 partial radial screw slot 34, 44 into the barrel extension 26 other screw hole 28.

In an embodiment the binocular loupes 10 IPD adjustment mechanism 60 includes an adjustment knob 62 having a plurality of teeth 74, a pinion gear 64 coupled to the knob 62, spring 66, washer 68, and spring retaining screw 72. The pinion gear 64 simultaneously engages the right arm 30 gear rack 38 and the left arm 40 gear rack 48. In an embodiment the right and left gear racks have the same gear spacing. In this embodiment rotation of the pinion gear 64 via the knob 62 in either direction causes both arms 30, 40 to move approximately equal distances relative to the knob, inward to outward to change the distance between the barrels and effective IPD for a user adorning the loupes 10. In this embodiment both the housing 50 and knob 62 have mating teeth 56, 74 respectively. In an embodiment the housing 50 and knob 62 each have 20 teeth spaced 18 degrees apart. In the loupes 10 the spring 66 is biased against the housing 50 bottom 54 and washer 68 where the washer 68 is coupled to the knob 62 via the retaining screw 72.

In stasis the spring 66 causes the knob teeth 74 to stably mate to the housing teeth 56 to lock the IPD between the barrel or telescope pair 20. To change the IPD, a user pulls the knob axially upward relative to the spring 66 axis to disengage the knob teeth 74 from the housing teeth 56, rotates the knob 62 about the axis in a direction to cause the arms 30, 40 to move inward or outward approximately equal distances simultaneously, and then releases the knob 62. The spring 66 bias then exerts sufficient axial downward force to reengage the knob teeth 74 to the housing teeth 56, securing the selected IPD distance and preventing unintentional IPD modification. In an embodiment the spring constant is about 9 to 11 pounds per inch.

Figure 2A:
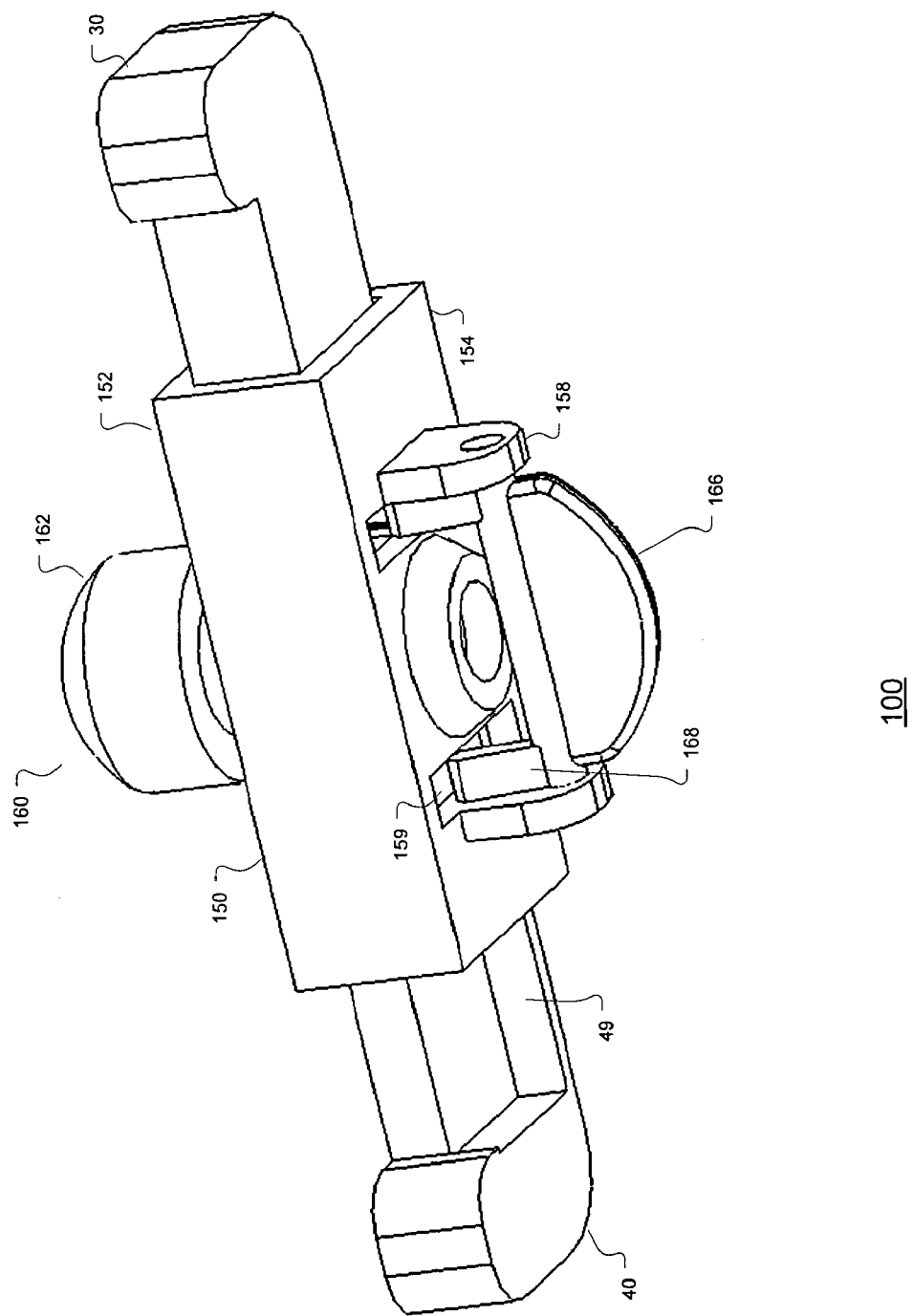
FIG. 2A is an isometric view of a binocular system in accordance with another embodiment of the present invention.
Figure 2B:
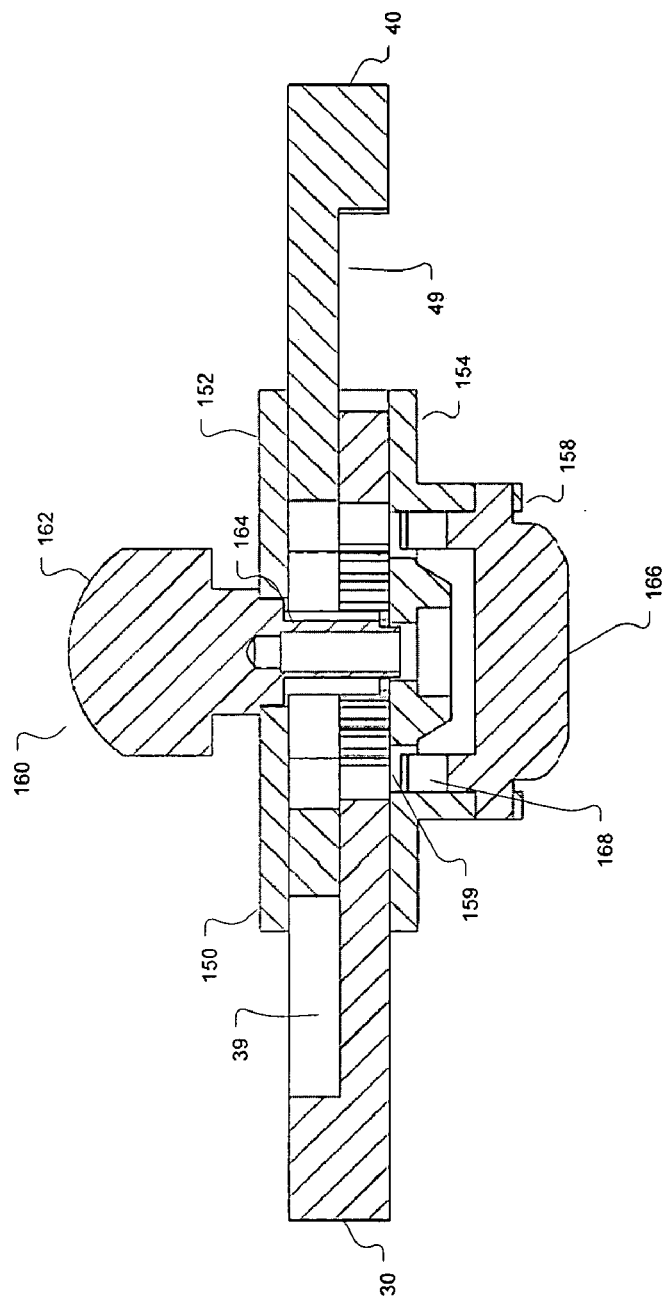
FIG. 2B is a sectional view of the binocular system shown in FIG. 2A.

FIG. 2A is an isometric view of a partial binocular system 100 in accordance with another embodiment of the present invention and FIG. 2B is a sectional view of the partial binocular system or loupes 100 shown in FIG. 2A. The binocular system 100 includes an IPD mechanism 160 and housing 150 according to another embodiment of the present invention. The barrel pair 20 is not shown for clarity. In this embodiment the IPD mechanism 160 includes a locking lever 166 with at least one locking tab 168. The housing 150 includes support arms for rotatably holding the locking lever 166 and at least one housing opening 159 that corresponds with the at least one locking tab 168. In this embodiment the arms or rails 30, 40 each include sleeves 39, 49 where arms 30, 40 may slide within each other. Similar to the IPD mechanism 60, the mechanism 160 also includes a pinion gear 164 coupled to a knob 162. The IPD mechanism 160 may also include teeth and the housing 150 corresponding mating teeth such as shown in FIG. 1A.

When the locking lever 166 of the IPD mechanism 160 is engaged by moving toward the barrel rear 24, the tabs 168 engage the lower, right arm 30 causing the right arm to move upward and compress against the upper, left arm 40 and housing 150. In this embodiment, after lever 166 engagement the IPD between the arms 30, 40 is stably fixed. The adjustment knob 162 would also be substantially immovable. When the locking level 166 of the IPD mechanism 160 is disengaged by moving it toward the barrel front 22, the tabs 168 via the housing 150 openings 159 release their compression force against the arms 30, 40. A user may then adjust the IPD via the adjustment knob 162 and lock the IPD by moving the lock lever 166 toward the rear.

Figure 3A:
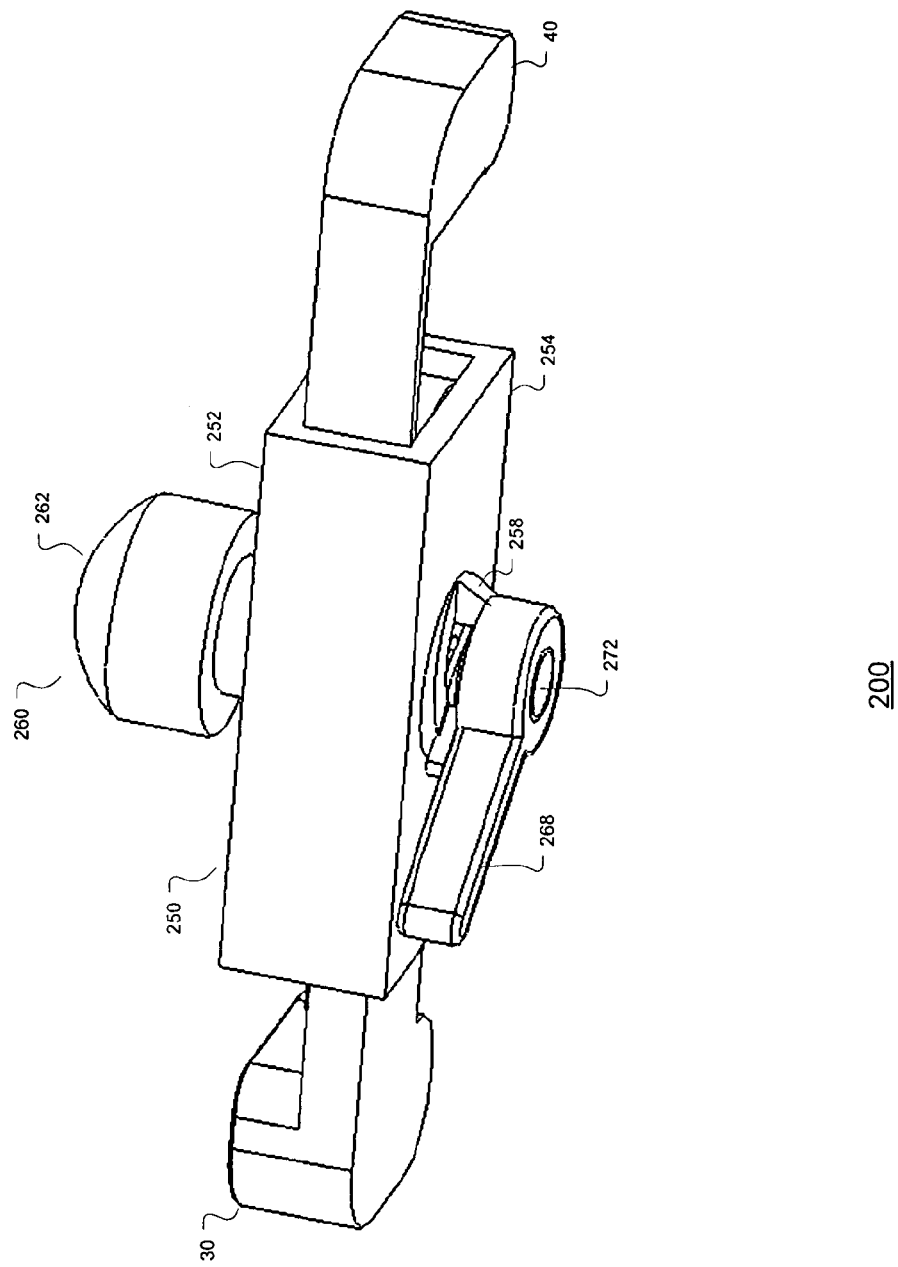
FIG. 3A is an isometric view of a binocular system in accordance with another embodiment of the present invention.
Figure 3B:
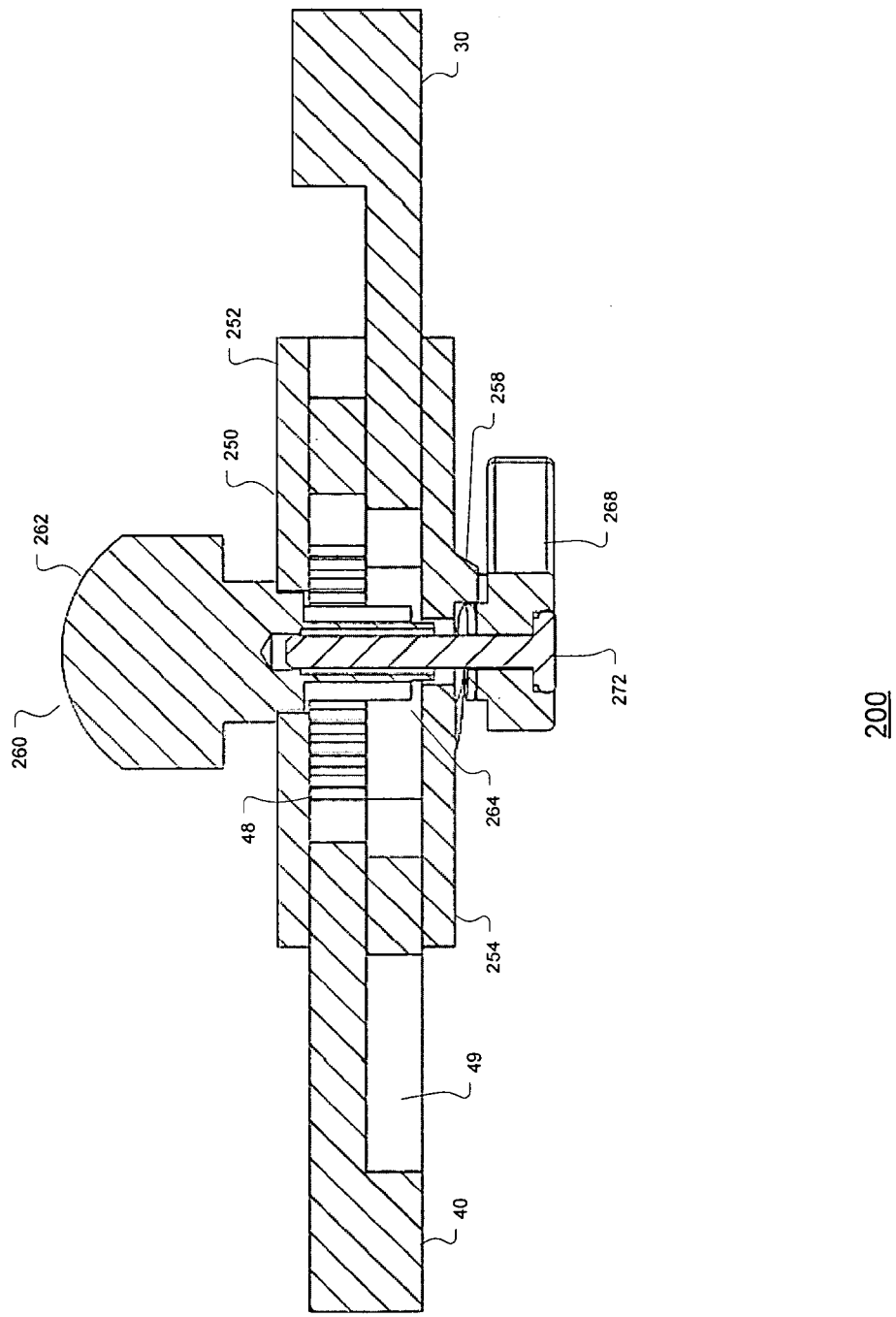
FIG. 3B is a sectional view of the binocular system shown in FIG. 3A.

FIG. 3A is an isometric view of another partial binocular system 200 in accordance with another embodiment of the present invention and FIG. 3B is a sectional view of the partial binocular system or loupes 200 shown in FIG. 3A. The binocular system 200 includes an IPD mechanism 260 and housing 250 according to another embodiment of the present invention. The barrel pair 20 is not shown for clarity. In this embodiment the IPD mechanism 260 includes a radially activated locking lever 268. The housing 250 includes a radial cam 258 that engages the radially activated locking lever 268. The locking lever 268 is coupled to the pinion gear 264 via a retaining screw 272. The IPD mechanism 260 may also include teeth and the housing 250 corresponding mating teeth such as shown in FIG. 1A.

When the locking lever 268 of the IPD mechanism 260 is engaged by rotating the lever about the pinion gear axis, the lever 268 engages the housing cam 258 causing a downward force on the retaining screw 272 and thereby compressing the adjustment knob 262 against the housing 250 top 252. After lever 268 engagement, the adjustment knob 262 is substantially immovable. When the locking level 268 of the IPD mechanism 260 is disengaged by radially moving lever 268 away from the housing cam 258, the compression against the adjustment knob 262 is released. A user may then adjust the IPD via the adjustment knob 262 and lock the IPD by radially moving the lock lever 268 toward the housing cam 258.

Figure 4A:
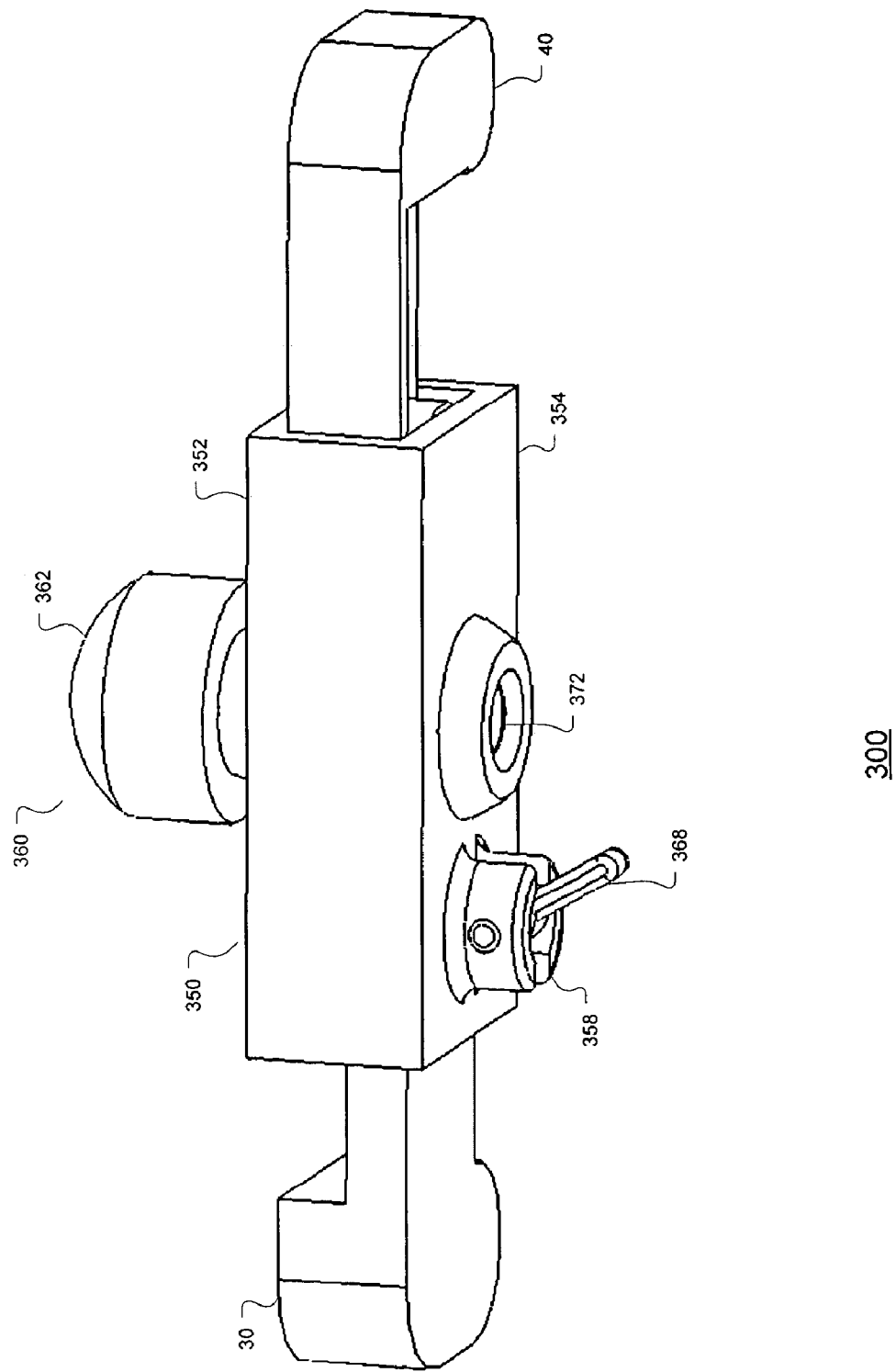
FIG. 4A is a view of a binocular system in accordance with another embodiment of the present invention.
Figure 4B:
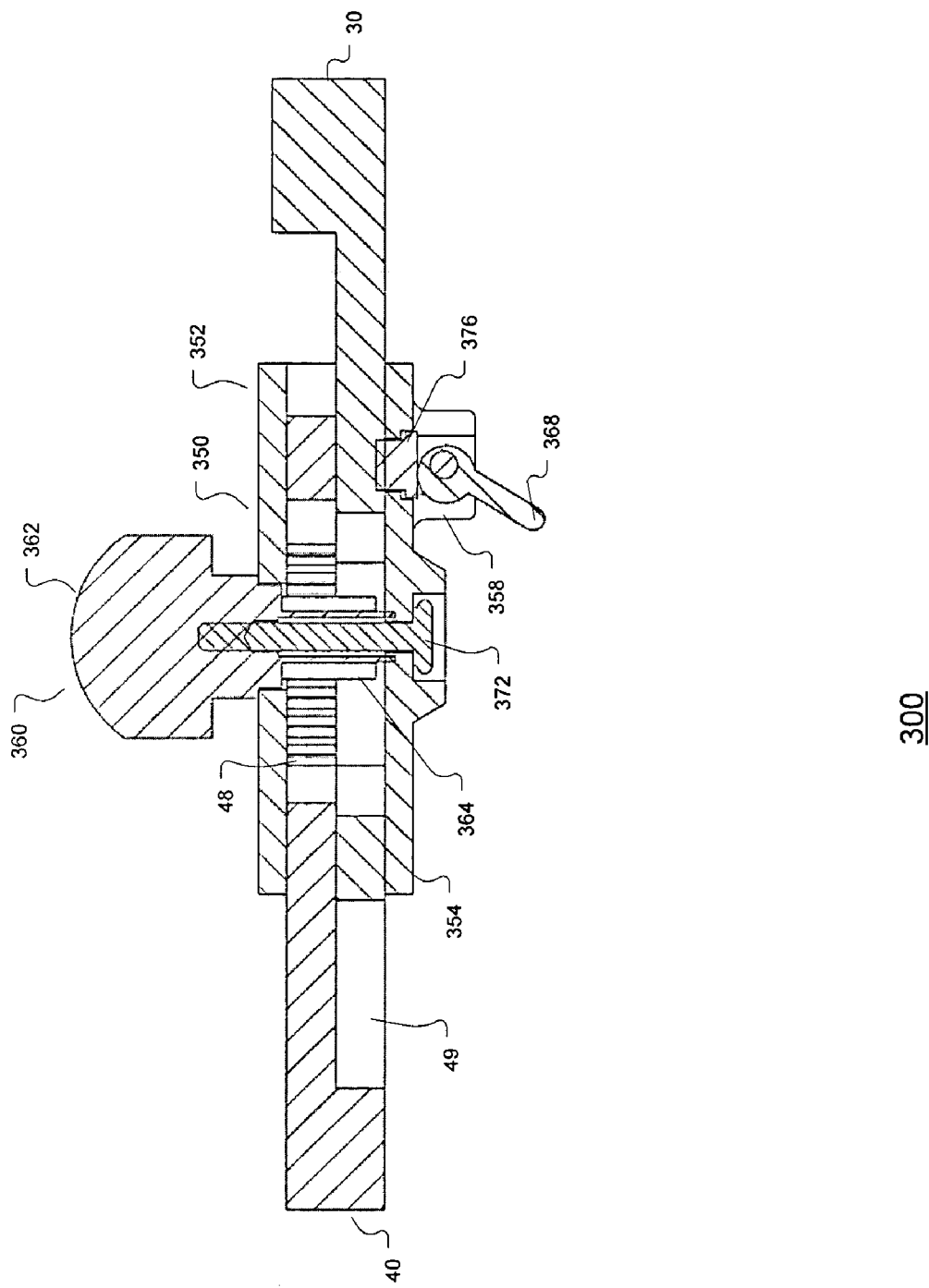
FIG. 4B is a sectional view of the binocular system shown in FIG. 4A.

FIG. 4A is a view of a partial binocular system 300 in accordance with another embodiment of the present invention and FIG. 4B is a sectional view of the partial binocular system or loupes 300 shown in FIG. 4A. The binocular system 300 includes an IPD mechanism 360 and housing 350 according to another embodiment of the present invention. The barrel pair 20 is not shown for clarity. In this embodiment the IPD mechanism 360 includes a locking cam lever 368 and rail locking member 376. The housing 350 includes support arms 358 for rotatably holding the locking cam lever 368. In this embodiment the arms or rails 30, 40 each include sleeves 39, 49 where arms 30, 40 may slide within each other. Similar to the IPD mechanism 60, the mechanism 360 also includes a pinion gear 364 coupled to a knob 362. The IPD mechanism 360 may also include teeth and the housing 350 corresponding mating teeth such as shown in FIG. 1A.

When the locking lever 368 of the IPD mechanism 360 is engaged by moving toward the right arm 30, the cam lever 368 pushes the rail locking member upward against the lower, right arm 30 causing the right arm to move upward and compress the upper, left arm 40 against the housing 350. In this embodiment, after cam lever 368 engagement the distance between the arms 30, 40 is stably fixed and thus, the IPD. The adjustment knob 362 would also be substantially immovable. When the locking cam level 368 of the IPD mechanism 360 is disengaged by moving toward the left arm 40, the rail locking member 376 is released, releasing its compression force against the arms 30, 40 and housing 350. A user may then adjust the IPD via the adjustment knob 362 and lock the IPD by moving the locking cam lever 368 toward the right arm 30.

While this invention has been described in terms of a best mode for achieving the objectives of the invention, it will be appreciated by those skilled in the art that variations may be accomplished in view of these teachings without deviating from the spirit or scope of the present invention. For example in another embodiment a single user rotatable screw may be coupled to the housing top 52 or bottom 54 so that upon rotation the screw tip may engage the right or left arm 30, 40 with sufficient force to prevent accidental movement of the arms 30, 40.

What is claimed is:

1. An adornable binocular device including:
    a telescope pair;
    two arms with one of the telescope pair attached to each arm;
    a housing, the housing holding at least a portion of two arms;
    a first telescope of the telescope pair pivotally mounted to the first arm and the other telescope of the telescope pair pivotally mounted to the second arm to enable independent line of sight convergence adjustment and each telescope of the telescope pair having a rear to be located proximal from an eye when in use and a front to be located distal from the eye when in use;
    a pivoting coupling between the first telescope and the first arm and located at a first location on the first telescope and a releasably slideable coupling between the first telescope and the first arm located at a second location on the first telescope, the second location offset from the first location so the first telescope horizontal line of sight may be angularly changed; and
    a pivoting coupling between the second telescope and the second arm and located at a first location on the second telescope and a releasably slideable coupling between the second telescope and the second arm located at a second location on the second telescope, the second location offset from the first location so the second telescope horizontal line of sight may be angularly changed.

2. The adornable binocular device of claim 1, wherein each arm includes a partially elongated slot releasably slideably coupled to the second location of each telescope pair.

3. The adornable binocular device of claim 2, wherein the partial elongated slot in each arm is dimensioned to permit at least 4 degrees of horizontal rotational movement between the front and the rear of the corresponding telescope.

4. The adornable binocular device of claim 3, wherein the second location of each telescope is located more distal from the rear of the telescope than the first location.

5. The adornable binocular device of claim 3, wherein the partially elongated slot in each arm forms a partial radial arc.

6. The adornable binocular device of claim 3, further including a non-lockable mechanical element extending from each pivoting coupling to the arm coupled to each telescope.

7. The adornable binocular device of claim 1, further including an inter-pupillary distance (IPD) adjustment mechanism coupled to the housing and for moving each telescope of the telescope pair relative to a center point.

8. The adornable binocular device of claim 7, wherein the IPD adjustment mechanism is activated by a rotational force.

9. The adornable binocular device of claim 7, further including teeth on the housing and a prevention mechanism for releasably preventing unintentional activation of the IPD adjustment mechanism, the prevention mechanism including teeth releasably mateable with the housing teeth and wherein the IPD adjustment mechanism is not adjustable when the prevention mechanism teeth is mated with the housing teeth and the IPD adjustment mechanism is adjustable when the prevention mechanism teeth is not mated with the housing teeth.

10. The adornable binocular device of claim 9, wherein the prevention mechanism includes a spring.

11. The adornable binocular device of claim 7, further comprising a prevention mechanism for preventing the displacement of the moveable arms by releasably applying compressive force from the at least a portion of the two moveable arms to the housing.

* * * * *